United States Patent [19]
Piazza et al.

[11] Patent Number: 5,380,183
[45] Date of Patent: Jan. 10, 1995

[54] VENTING DEVICE FOR ROTOCASE SHELL MOLDS

[75] Inventors: Charles L. Piazza, Somersworth; Edward E. Therrien, Newington, both of N.H.

[73] Assignee: Davidson Textron, Inc., Dover, N.H.

[21] Appl. No.: 670,932

[22] Filed: Mar. 18, 1991

Related U.S. Application Data

[63] Continuation of Ser. No. 504,388, Apr. 4, 1990, abandoned.

[51] Int. Cl.⁶ ............ B29C 33/10; B29C 41/04; 249 141
[52] U.S. Cl. ............... 425/434; 425/435; 425/812; 249/141
[58] Field of Search ......... 249/141; 264/310; 425/420, 435, 546, 812, 434

[56] References Cited

U.S. PATENT DOCUMENTS

| | | | |
|---|---|---|---|
| 2,294,935 | 9/1942 | Ritchie | 249/141 |
| 3,704,081 | 11/1972 | Immel | 425/812 |
| 3,914,361 | 10/1975 | Shiina et al. | 425/812 |
| 3,969,475 | 7/1976 | Horiuchi et al. | 264/310 |
| 4,026,512 | 5/1977 | Holt | 249/141 |
| 4,359,443 | 11/1982 | Michaels | 425/812 |
| 4,403,939 | 9/1983 | Rothschild et al. | 425/434 |
| 4,436,497 | 3/1984 | Dahl et al. | 425/812 |
| 5,094,608 | 3/1992 | Piazza et al. | 425/434 |

FOREIGN PATENT DOCUMENTS 1060334 3/1967 United Kingdom ............... 425/812

*Primary Examiner*—James P. Mackey
*Attorney, Agent, or Firm*—Reising, Ethington, Barnard, Perry and Milton

[57] ABSTRACT

A venting device for a rotocast shell mold body having a neck and a flanged neck plate thereon. The venting device is a tube formed of black iron pipe of a predetermined diameter and length and mounted in an opening formed in one of the neck or a cover mounted on the neck plate, and extended for approximately half its length into the interior of the mold. When used with the neck of the mold, the tube is welded in place, and when used with a mold cover, the tube is threadedly mounted therein.

3 Claims, 1 Drawing Sheet

VENTING DEVICE FOR ROTOCASE SHELL MOLDS

This is a continuation of application of Ser. No. 504,388, filed on Apr. 4, 1990, now abandoned.

TECHNICAL FIELD

This invention relates generally to molding apparatus vents, and, more particularly, to vents for rotocast shell molds.

BACKGROUND ART

Heretofore, various forms of venting have been used in molding processes. For example, Dotson U.S. Pat. No. 2,550,140 discloses an air escape vent between the periphery of a rod and the surrounding opening formed in the neck mold of a press or blow mold. The vent is large enough to let air pass therethrough and, yet, small enough to prevent liquid from passing therethrough.

Moslo U.S. Pat. No. 2,976,571 discloses a mold vent which allowed gas to pass therethrough while restricting liquid from passing therethrough. This is done by restricting the opening at the cavity end of the exhaust path of the vent.

Foti U.S. Pat. No. 2,976,568 discloses an injection mold apparatus with a vent and a plunger. The vent serves to allow air to pass therethrough and the plunger is used to clean the vent once the vent becomes clogged with mold material.

Kamiyama et al U.S. Pat. No. 4,822,269 discloses a vent port communicating between first and second nozzles of an injection mold which opens after the mold material has been injected and a reciprocatable screw has been retracted therepast.

Gayso U.S. Pat. No. 4,796,686 discloses a Centrifugal casting machine. The rotation creates a centrifugal force which forces the mold material to the outer edges of the mold. Air and other gases escape through a venturi tube arrangement which is attached to the casting arm and serves to create a vacuum outside the mold cavity which aids in the removal of unwanted gases.

DISCLOSURE OF THE INVENTION

A general object of the invention is to provide an improved rotational molding assembly, including a venting apparatus to release air from the mold, thereby preventing warpage of the usual neck plate and resultant leakage therepast.

Another object of the invention is to provide a rotocast shell mold assembly including a strategically located vent tube of a predetermined diameter and length.

A further object of the invention is to provide a vent tube having a predetermined portion of the length thereof extended through an opening formed in either the cover or the neck of a rotocast shell mold.

Still another object of the invention is to provide a threaded vent tube which is threadably mounted in a tapped hole formed in the cover of a rotocast shell mold to release air from the mold and prevent leakage therefrom.

A still further object of the invention is to provide a vent tube which is welded in place in an opening formed in the neck of a rotocast shell mold to minimize moldneck plate warpage and consequent leakage.

These and other objects and advantages of the invention will become more apparent when reference is made to the following drawings and accompanying description.

BEST MODE OF CARRYING OUT THE INVENTION

Figure 1:
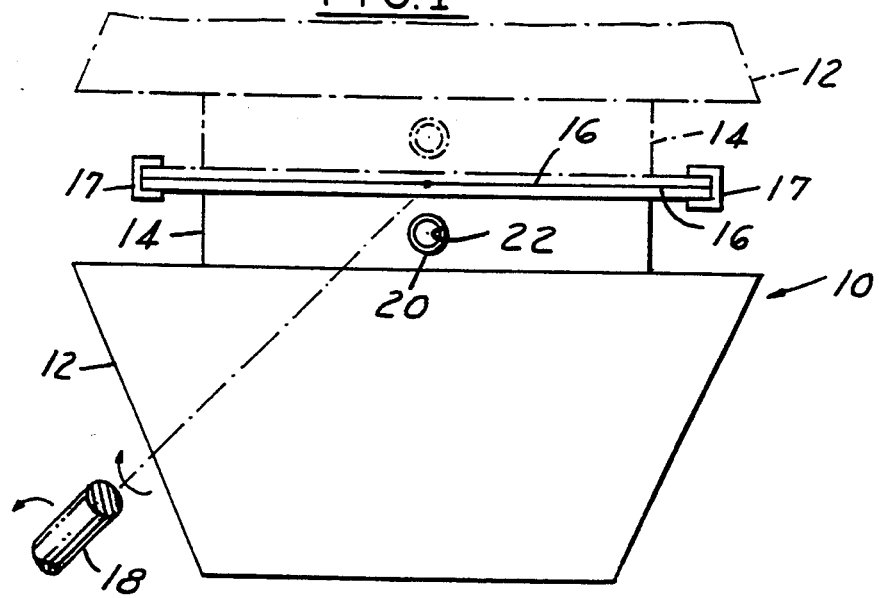
FIG. 1 is a side elevational view of a mold embodying the invention.

Referring now to the drawings in greater detail, FIG. 1 illustrates a rotocast shell mold arrangement 10 including a pair of molds 12 each having a neck 14 and a flanged neck plate 16. Typically, the neck plates are secured together by suitable clamps, represented at 17.

In the typical operation of the rotocast shell mold arrangement 10, the material to be molded is inserted in the molds 12 and the molds are closed one on the other as shown in FIG. 1. The molds are heated to a predetermined temperature and spun and/or rotated by a suitable spinning mechanism, represented at 18, to create a centrifugal force. Due to the centrifugal force, the particles of mold material are forced to the edges and sides of the molds 12 and the respective necks 14. The particles of mold material then melt to form an outer layer or skin. This process is continued until there are many layers formed to create the article which is being molded. The heat created by the heated mold 12 expands the air present in the mold. Without a suitable venting arrangement, the pressure created by the expanding air becomes trapped inside the molded material, creating imperfections therein, and causing warpage of the flanged neck plates 16. As a result of the warpage, leakage could occur from between the flanged neck plates 16. Accordingly, frequent milling of the neck plate surfaces had been required to eliminate the warpage. This could continue from an original neck flange thickness of approximately 3/8 inch to a final thickness of ⅛ inch.

To alleviate such a result, a vent tube 20 is mounted in an opening 22 formed in each neck 14. The vent tube 20 consists of a piece of black iron pipe of a predetermined length and a predetermined diameter. For most rotocast shell mold applications a length of two inches of ¼ inch diameter pipe is recommended. Typically, the tube is mounted in the opening so that from ¾ to 1 inch of its length is extended inside the neck 14. Once in position, the tube is welded in place, preferably on the outside of the neck.

Where the mold is large and takes a large shot weight, the tube 20 should be inserted further into the mold and, conversely, where the mold is small and takes a small shot weight, a shorter length is inserted into the mold.

When the neck of the mold is rectangular in cross-section, the vent tube 20 is inserted in one of the longer sides of the neck.

Tests have shown that molds bearing the vent tube 20 extended into the mold as suggested above, have (1) relieved pressure from inside the mold caused by expanding air when the mold is heated, and (2) demonstrated minimal neck plate warpage, resulting in minimal material leakage from between the abutting neck plates.

Figure 2:
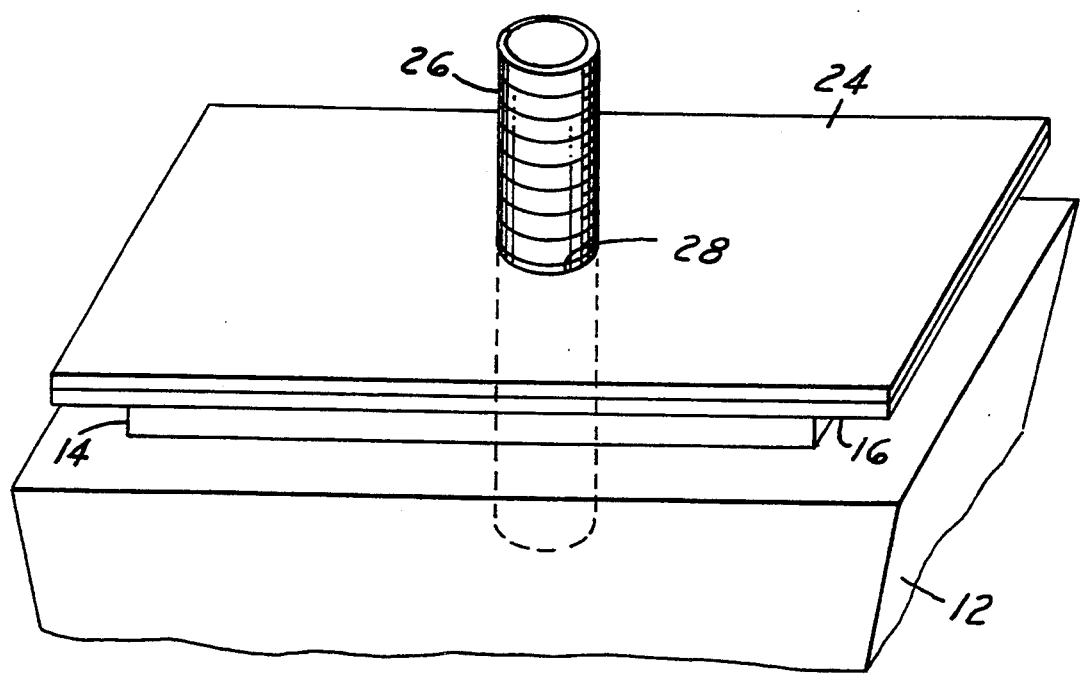
FIG. 2 is a perspective of an alternate embodiment of the invention.

Alternatively, as shown in FIG. 2, when only one mold 12 is to be spun, a cover 24 is mounted on the neck plate 16. A vent tube 26 is then installed in the cover 24.

A drilled and tapped opening 28 is formed in the cover and the tube 26 is threaded for a portion of its length and threadedly mounted in the opening 28 such that approximately one inch of unthreaded tube length extends inside the mold.

The vent tubes 20 and 26 are to be cleaned out, as by blowing the mold material therefrom after each use to be ready for the next cycle.

INDUSTRIAL APPLICABILITY

It should be apparent that the invention provides a simplified and efficient means for venting either single or double rotocast shell molds.

It should also be apparent that the invention may be adapted to existing mold necks and mold covers.

While but two embodiments of the invention have been shown and described, other modifications are possible within the scope of the following claims.

The embodiments of the invention in which an exclusive property or privilege is claimed are defined as follows:

1. A rotocast shell mold assembly comprising a first mold, a first neck connected thereto, a first flanged neck plate formed on the end of the neck away from said mold, and a second mold, a second neck and a second flanged neck plate secured to the first neck plate in an abutting relationship, and a venting device including an opening formed in each of the first and second necks, and a single hollow continuously open vent tube of a predetermined length mounted in each of said openings such that the vent tube extends a predetermined length into the interior of each neck to relieve the pressure within the molds and thereby prevent warpage of either or both said first and second flanged neck plates to eliminate frequent milling thereof.

2. The rotocast shell mold assembly described in claim 1, wherein said vent tubes are welded in place when mounted in said openings formed in said necks to thereby prevent warpage of said abutting neck plates.

3. The rotocast shell mold assembly described in claim 1, wherein each vent tube is formed of $\frac{1}{4}$ inch diameter black iron pipe approximately two inches long with approximately one inch thereof extended into the interior of each mold.

* * * * *